US006701160B1

(12) United States Patent
Pinder et al.

(10) Patent No.: US 6,701,160 B1
(45) Date of Patent: Mar. 2, 2004

(54) METHOD AND APPARATUS TO LOCALLY BLOCK INCOMING SELECTED CALLS

(75) Inventors: Ellis Arthur Pinder, Plantation, FL (US); Alfred B. Wieczorek, Plantation, FL (US); Jose E. Korneluk, Boynton Beach, FL (US); David S. Seekins, Sunrise, FL (US)

(73) Assignee: Motorola, Inc., Shaumburg, IL (US)

( * ) Notice: Subject to any disclaimer, the term of this patent is extended or adjusted under 35 U.S.C. 154(b) by 0 days.

(21) Appl. No.: 09/575,272

(22) Filed: May 22, 2000

(51) Int. Cl.⁷ .................................. H04M 1/00

(52) U.S. Cl. .................... 455/550.1; 455/418; 455/565; 455/422.1; 397/188

(58) Field of Search .................... 455/566, 242, 455/550, 417, 33.1, 70, 414.1, 433, 458, 415, 466, 418, 425.1; 379/196, 188, 199, 210.01, 211.01

(56) References Cited

U.S. PATENT DOCUMENTS

| | | | | | |
|---|---|---|---|---|---|
| 5,467,388 A | * | 11/1995 | Redd et al. | ................. | 379/196 |
| 5,590,396 A | * | 12/1996 | Henry | ........................ | 455/426 |
| 6,088,589 A | * | 7/2000 | Valentine et al. | ........... | 455/433 |
| 6,418,211 B1 | * | 7/2002 | Irvin | .......................... | 379/188 |
| 2001/0051534 A1 | * | 12/2001 | Amin | ........................ | 455/565 |

* cited by examiner

Primary Examiner—Sinh Tran
Assistant Examiner—Kamran Afshar
(74) Attorney, Agent, or Firm—Scott M. Garrett

(57) ABSTRACT

A mobile communication device (100) contains a memory (110), a controller (112) and transceiver components (120, 122, 124, 126). When an incoming call signal is received (314), the controller compares the source identifier with various lists (210, 240, 270) stored in the memory. If the source identifier is contained on a rejection list, the call is rejected. If the source identifier is contained on an acceptance list, the call is received normally, unless a do not disturb feature is active. The lists may be fixed or selectable. Selectable lists are configurable by the user of the mobile communication device, whereas fixed list types cannot be changed by the user of the mobile communication device.

12 Claims, 3 Drawing Sheets

METHOD AND APPARATUS TO LOCALLY BLOCK INCOMING SELECTED CALLS

TECHNICAL FIELD

This invention relates in general to mobile communication systems and more particularly to methods for identifying and selectively receiving calls at a mobile station.

BACKGROUND

Users of portable communication devices often encounter situations where it is desirable not to be disturbed, or where contact should be limited to a preferred group of people. Turning off the device stops incoming calls, but it prevents paging messages or high-priority calls from being received. Furthermore, the device is not readily available for immediate communication. A silent, vibrating alert feature offers an improvement, but such a feature requires the user to pick up the radio and determine the caller's identity every time a call is received. This is considered by many users to be an annoyance, especially when the calls received are dispatch-type calls associated with a two-way radio. A radio typically transmits an acknowledgement whenever an incoming call is received, which adversely affects battery life, as do vibrating alerts and short audible alerts. Battery life is an important consideration to users of portable devices.

Business users of such devices may wish to limit, or more specifically, control call-in access to radios to ensure they are being used for business purposes. For example, it is desirable under certain circumstances to limit incoming calls to those on a pre-approved list. It is also desirable to block calls from certain callers. In both of these cases, an improvement can be realized by identifying the source of the incoming call, comparing the caller source information to an access list, and optionally blocking the call based on the result of the comparison. Thus the need exists for a method to locally block selected incoming calls.

DETAILED DESCRIPTION OF THE PREFERRED EMBODIMENT

Figure 1:
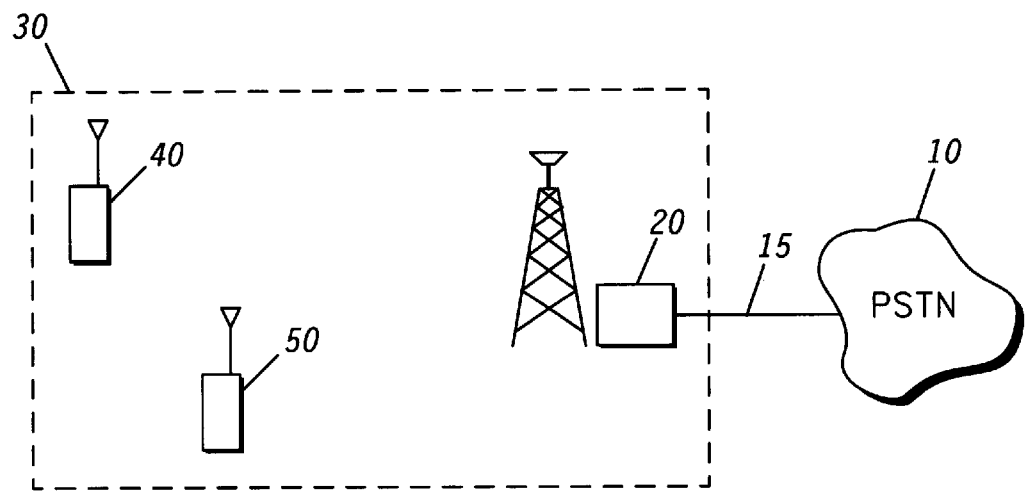
FIG. 1 shows a communication environment having a plurality of communication subscriber units in accordance with the present invention.

While the specification concludes with claims defining the features of the invention that are regarded as novel, it is believed that the invention will be better understood from a consideration of the following description in conjunction with the drawing figures, in which like reference numerals are carried forward.

When an incoming call is received by a subscriber unit, the communication system transmits source identification information along with the call. The incoming call can be a phone call from a telephone network, a private, or unit to unit call made directly from another subscriber unit, or a short message service or page call. The subscriber unit then decides whether or not the call will be accepted, according to a set of rules stored in the subscriber unit. If the rule set determines that the call may proceed, then the user is alerted to the incoming call and can respond. If the rule set determines that the call should be rejected, the user is not alerted and the call is terminated.

Referring to FIG. 1, a block diagram of communication system 30 is shown, and includes a plurality of mobile stations or subscriber units, including a first subscriber unit 40 and a second subscriber unit 50. The communication system may further include a communication system infrastructure 20. The communication system 30 can be, for example, a two-way radio system or a cellular system. The communication system infrastructure 20 is typically connected to a public switched telephone network (PSTN) 10 through communication link 15, such as a frame relay link. The communication link 15 allows subscriber units of communication system 30 to communicate over the PSTN. The first subscriber unit 40 can make a call to another subscriber unit, such as second subscriber unit 50. The call can be directly from one subscriber unit over the air to the other subscriber unit, or it may be facilitated by the communication infrastructure 20. Furthermore, the call can be a private call to a single other subscriber unit, or it can be to multiple other subscriber units. The second subscriber unit 50 receives notification of the call from either the infrastructure 20, or from first unit 40. The notification contains a source identifier (ID) of the caller that identifies the first subscriber unit 40 as the calling party to the second subscriber unit. The second subscriber unit 50 then decides, according to a list of locally-stored rules, whether to allow the call to proceed.

In an alternate embodiment, an external call initiated from PSTN 10 is directed towards first subscriber unit 40. The telephone network will send the call notification and source ID information over connection 15 to communication system 30, where infrastructure 20 will forward the call to the appropriate subscriber unit, such as first subscriber unit 40. Those skilled in the art will recognize the source ID information in this embodiment may be the so-called caller ID service provided by the operators of the PSTN 10. The first subscriber unit 40 receives notification of the call from infrastructure 20, and the notification contains the source ID of the caller, which typically includes the phone number of the external caller from telephone network 10. First subscriber unit 40 then decides, according to a list of locally-stored rules, whether to allow the call to proceed.

Figure 2:
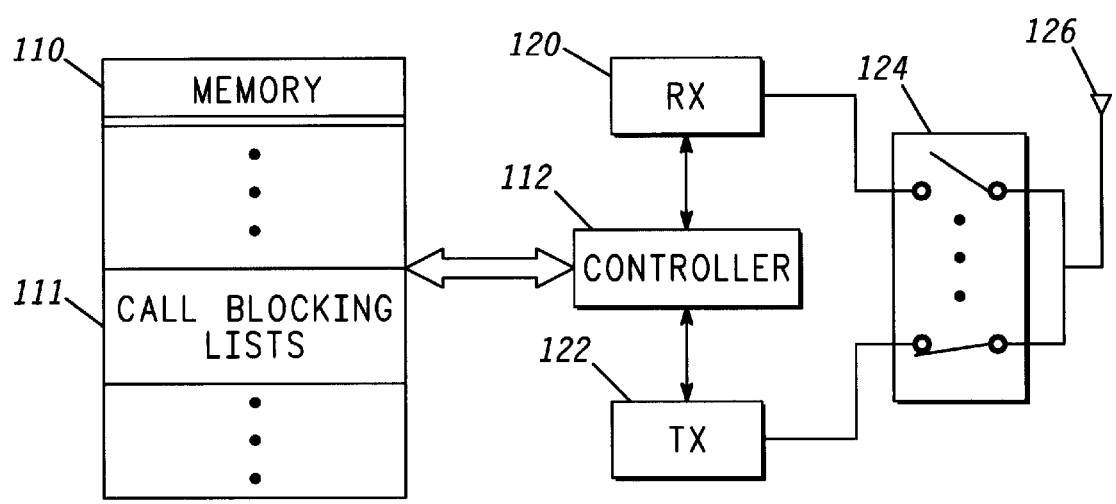
FIG. 2 shows a block diagram of a transceiver operating as a subscriber unit in the communication environment of FIG. 1, in accordance with the present invention.

A block diagram of a typical subscriber unit 100, such as first subscriber unit 40, is shown in FIG. 2. Referring now to FIG. 2, a transceiver operating as a subscriber unit 100 comprises a receiver 120 and transmitter 122, both electrically coupled to antenna 126 via antenna switch 124, as is common in the art. Receiver 120 and transmitter 122 are both electrically coupled to controller 112, which may be, for example, a microprocessor for operating subscriber unit 100. Controller 112 operates according to instruction code stored in a memory 110. The memory also further contains call blocking information 111, including data and rules, as is described hereinbelow. Upon receipt of a call, controller 112 processes the received source ID according to the set of rules stored in the call blocking information section of memory 110. In the preferred embodiment, the call blocking information is stored in a portion of memory 110 that is non-volatile and programmable to ensure the information is maintained when electrical power is removed from subscriber unit 100.

Figure 3:
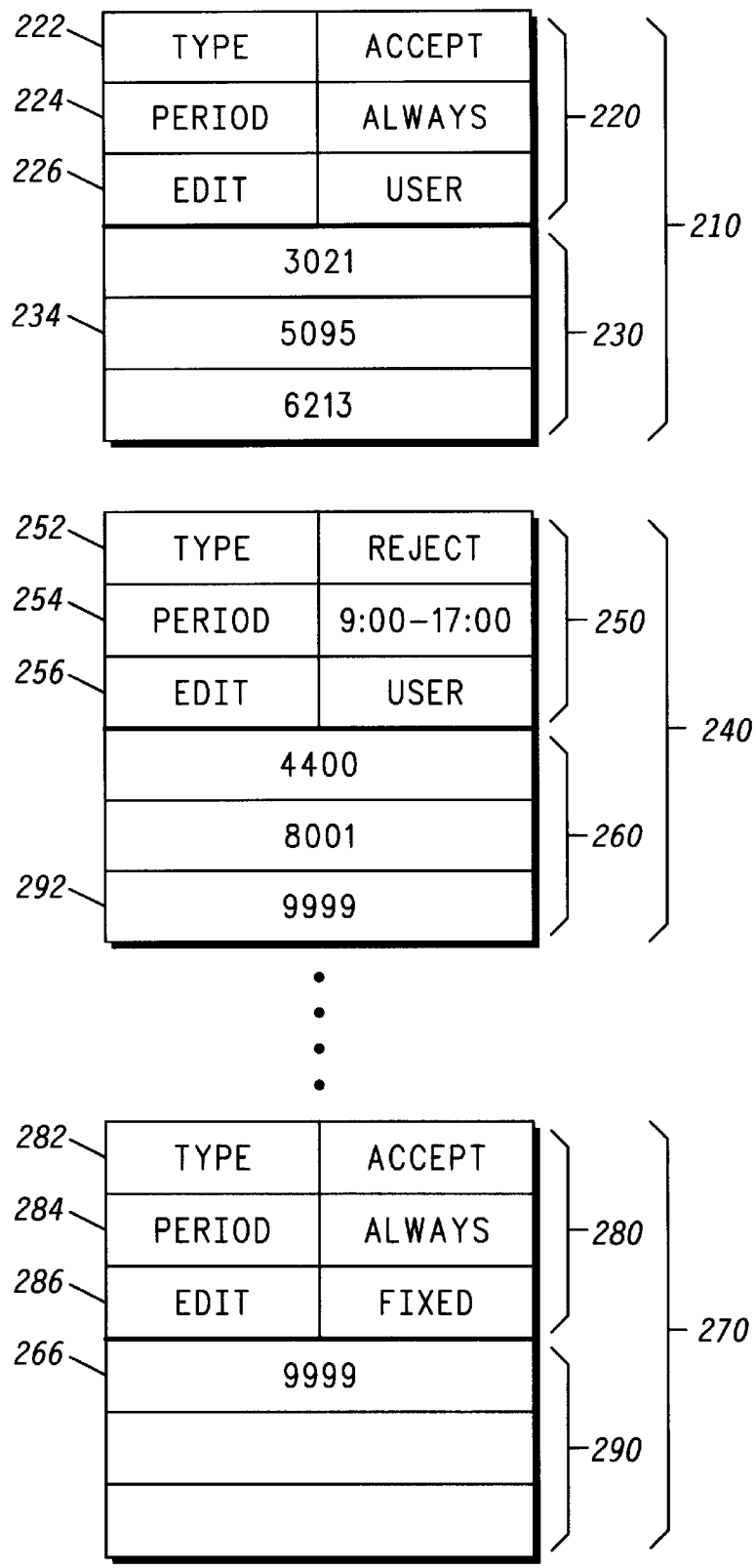
FIG. 3 shows a block diagram of the call blocking list of FIG. 2, in accordance with the present invention.

Referring now to FIG. 3, there is shown a block representation 200 of call blocking information for use in a radio subscriber unit in accordance with the invention. The call blocking information comprises at least one call blocking list, such as a first call blocking list 210. The first call blocking list 210 comprises two sections; a list configuration 220 and a source ID list 230. The source ID list 230 contains source IDs which are compared to the source ID received with an incoming call according to rules in list configuration 220. In the preferred embodiment, the subscriber unit is placed in a "do not disturb" mode to enable call blocking. The list configuration 220 specifies what type of list the present list is, with the preferred types being acceptance and rejection lists. The list configuration 220 specifies, for example, that the list type 222 indicates the first call blocking list is an acceptance list. An acceptance list informs the subscriber unit to allows calls received from callers listed in the source ID list 230 to bypass the call blocking feature. For example, a call received from a caller with ID 5095 (234) will be processed, resulting in an alert to the user, even though the call blocking feature may be enabled.

In the preferred embodiment, the user can configure certain parameters associated with a call blocking list. For example, the user can indicate that source ID list 230 can be time-sensitive, meaning that the rules are enforced during a specified time period and are not enforced outside that time period. It is contemplated that the time period may be established by a timer for a preselected period of time, or according to a clock to establish valid times of day for enforcing the rule. For example, as shown in the first call blocking list 210, the active period for rule enforcement 224 is "always." The rules specified by list configuration 220 and the source ID list 230 may further be controlled by the user, at the option of the manufacturer or owner of the radio, as indicated by the entry "user-selectable," in a list edit type 226. These types of lists that are editable by the user are referred to simply as selectable lists. A selectable list edit type, for example, would permit the user to make changes to the source ID list 230, such as adding, changing, and deleting operations. In one embodiment, changes to list configuration 220 would not be permitted. In an alternate embodiment, changes to selected fields in list configuration 220, such as active period 224, would be allowed.

The second call blocking list 240 contains a list configuration 250 and source ID list 260. This call blocking list is representative of one used to reject incoming calls from certain parties. For example, the list type 252 indicates that this list is a rejection list to the controller 112, and the action for this list is to block incoming calls that match a source ID in the source ID list 260. This is in contrast to first call blocking list 210 which functioned as an acceptance list. Here the active period 254 indicates, for example, that this list is enforced during a specified time period, such as 09:00 to 17:00 hours daily. Here the list edit type 256 indicates that second call blocking list 240 is also user editable.

A third call blocking list 270 contains list configuration 280 and Source ID list 290. The list type 282 indicates that the third call blocking list 270 is an acceptance list, and the action for this list is to allow incoming calls that match a source ID in source ID list 290. Here the active period 284 indicates that the rules for this list are always enforced, and the list edit type 286 indicates that the third call blocking list is fixed. Thus, the third call blocking list 270 effectively forces the subscriber unit to alert a user when receiving a call from a caller whose ID is in this source ID list, and this status is not changeable by the user.

In the present invention, fixed call blocking lists have higher priority than user-selectable call blocking lists. For example, a subscriber user can edit the second call blocking list 240 and add source ID "9999" (266). This is permitted, since list edit type 256 specifies the second call blocking list 240 to be user-selectable, or simply selectable list. There are selectable acceptance lists and selectable rejection lists. The third call blocking list 270, however, is a fixed list as previously described and as indicated by list edit type 286. The third call blocking list 270 contains source ID list 290 which also contains source ID 9999 (292). The third call blocking list 270 has list type 282 set to make it an acceptance list, which means the source ID in source ID list 290 shall not be blocked. It is evident that a conflict exists for the two entries of source ID 9999 (266, 292). Since fixed call blocking lists have higher priority, a call received from a caller having a source ID of 9999 result in an alert being given to the user, even though the user had placed the source ID in a user selectable rejection list.

The precedence given to call blocking lists of fixed type is an advantage because it provides some means of restricting the subscriber unit's ability to block calls. A business owner, for example, with a fleet of radios may wish to ensure all employees cannot block calls from the office dispatcher or the foreman. The business owner could instruct the radio provider to configure the radios in such a manner prior to delivery, by placing the source ID of the dispatcher or foreman in each other radio's fixed acceptance list. Employees could still utilize the blocking feature with by selectable call blocking lists, but they would not be able to override rules set by the business owner.

In an alternate embodiment, a call blocking list could be specified that is selectable with a list type of rejection list. Such a list would allow the user to enter entries that might be associated with nuisance callers. This embodiment would provide a button or menu item on the subscriber that would place the current caller on the list. In other words, when a nuisance call is received, the user simply, for example, by pushing a button, adds the source ID of the nuisance caller to the user selectable rejection list.

Figure 4:
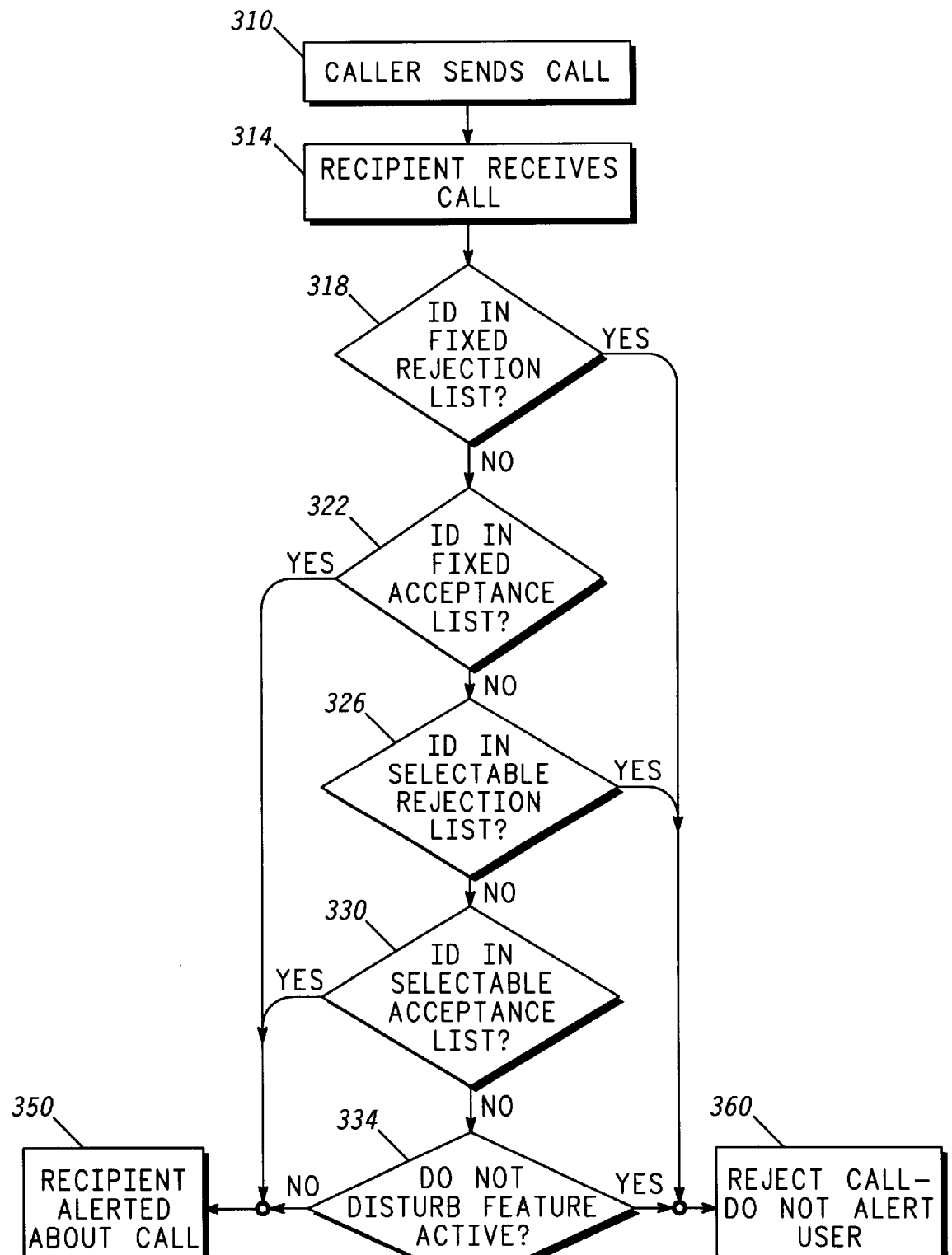
FIG. 4 shows a flowchart diagram showing the processing of a received call by a subscriber unit in accordance with the present invention.

Referring now to FIG. 4, there is shown a flow chart diagram of a method for blocking calls, in accordance with the invention. The calling party first initiates a call, which sends a call signal (310) from either the mobile communication device directly to the target mobile communication device, or from the base station to the target mobile communication device. The receiving subscriber unit receives a call request (314) from a calling party, which includes a source ID of the equipment of the calling party, and in accordance with the invention, the subscriber unit compares the source ID to source ID in various call blocking lists stored in the subscriber unit, such as those described in reference to FIG. 3. If the source ID of the caller is in a rejection list and has a fixed edit type (318), then the call is rejected (360). If the source ID of the caller is not in a call list that is a rejection list and has a fixed edit type (318), then evaluation continues. If the source ID of the caller is in a call list that is an acceptance list and has a fixed edit type (322), then the call is accepted and the user is alerted (350). If the source ID of the caller is otherwise in a rejection list and has a user-selectable edit type (326), then the call is rejected (360). If the source ID of the caller is not in a rejection list (326), then evaluation continues. If the source ID of the caller is in an acceptance list and has a user-selectable edit type (330), then the call is accepted and the user is alerted (350). Finally, if the source ID is not found to be associated with any of the four call list types, and if the call blocking feature has been enabled, then the call is rejected (360). Otherwise the call is accepted and the user is alerted (350).

It will be noted that the preferred order is to check the fixed list types first before checking those that are user configurable. Checking fixed list types first establishes their priority over user configurable list types.

In the preferred embodiment, no acknowledgement is sent by the subscriber to acknowledge the call if the call is rejected. This provides no feedback to the caller that the subscriber is available, but it does offer power-savings benefits. In an alternate embodiment, an acknowledgement is sent back to the caller, even though the receiving subscriber is not alerted. In yet another embodiment, a negative acknowledgement is sent back to the caller. The caller is now aware that the receiving subscriber is on the system, but is not accepting communication from the caller. The receiving subscriber unit maintains a list of recently-received, rejected calls to allow the subscriber user at a later time to contact callers that were rejected. It is further contemplated that each of these choices of acknowledgement may be associated with each source ID so that the type of acknowledgement the caller receives depends on the setting determined by the user of the subscriber unit being called.

Thus, the invention can be used for selectively blocking incoming calls at a subscriber unit. For example, if the user first sets the subscriber unit into the do not disturb mode, then receives an incoming call, the call will be accepted even though the do not disturb mode is active if the source identifier of the calling party is on an acceptance list of ether type (fixed or selectable). However, if the source identifier is not on an acceptance list, the call will be rejected, meaning the subscriber unit will not alert the user to the incoming call and will ignore the call. If the subscriber unit contains a selectable rejection list, and the source ID is on a fixed acceptance list, then the call will still be accepted.

The invention can also be used for discriminating incoming calls at a mobile communication device. For example, if the mobile communication device has a fixed acceptance list and a selectable rejection list, upon receiving an incoming call from a calling party, the mobile communication device performs the step of comparing the source identifier with the fixed acceptance list. If the source identifier is on the fixed acceptance list, the mobile communication device commences accepting the incoming call. Accepting the incoming call includes alerting the user of the mobile communication device via an audible ringer or, for example, a vibration alert. If the source identifier is not on the fixed acceptance list, and there is no selectable acceptance list, the mobile communication device compares the source identifier to the selectable rejection list and rejects the incoming call if the source identifier is contained in the selectable rejection list. It is preferable if the mobile communication device looks at the fixed acceptance list prior to comparing the source identifier to the selectable rejection list. If the source identifier is not on either type of list and the do not disturb mode is active, the call will be rejected. If a fixed rejection list is present, it will preferably be examined prior to any selectable lists, and the call will be accepted if the source identifier of the incoming call is found on the fixed acceptance list. Finally, if the source identifier is on a selectable acceptance list, the call will be accepted even if the do not disturb mode is active.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selectively blocking incoming calls at a subscriber unit, the subscriber unit having a memory, the method comprising: setting the subscriber unit into a do not disturb mode; receiving an incoming call, including receiving a source identifier; accepting the incoming call if the source identifier is found on a fixed acceptance list, even if the source identifier is found on a selectable rejection list, the fixed acceptance list not being changeable by a user of the subscriber unit; and rejecting the incoming call if the source identifier is found on the selectable rejection list and not found on the fixed acceptance list.

2. A method for selectively blocking incoming calls as defined in claim 1, wherein the step of accepting the incoming call comprises accepting the incoming call even if the source identifier is found on a selectable rejection list, the selectable rejection list being changeable by the user of the subscriber unit.

3. A method for discriminating incoming calls at a mobile communication device, the mobile communication device having a fixed acceptance list, and a selectable rejection list, the method comprising:

receiving an incoming call from a calling party including a source identifier of the calling party;

comparing the source identifier with the fixed acceptance list and accepting the incoming call if the 'source identifier is contained in the fixed acceptance list, the fixed acceptance list not being changeable by a user of the subscriber unit; and comparing the source identifier to the selectable rejection list and rejecting the incoming call if the source identifier is contained in the selectable rejection list unless the source identifier is on the fixed acceptance list, the selectable rejection list being changeable by the user of the mobile communication device.

4. A method for discriminating incoming call as defined by claim 3, wherein the comparing the source identifier to the fixed acceptance list occurs prior to comparing the source identifier to the selectable rejection list.

5. A method for discriminating incoming call as defined by claim 3, further comprising rejecting the call if a do not disturb mode is active.

6. A method for discriminating incoming call as defined by claim 3, further comprising comparing the source identifier to a fixed rejection list and rejecting the incoming call if the source identifier is contained in the fixed rejection list.

7. A method for discriminating incoming call as defined by claim 3 further comprising comparing the source identifier to a selectable acceptance list and accepting the incoming call if the source identifier is contained in the selectable acceptance list.

8. A mobile communication device for discriminating incoming calls, comprising:

means for receiving an incoming call;

a memory means containing a fixed acceptance list, and a selectable rejection list, the fixed acceptance list not being changeable by a user of the mobile communication device, the selectable rejection list being changeable by the user of the mobile communication device, wherein the fixed acceptance list is a fixed list type and the selectable rejection list is a selectable list type; and controller means for comparing a source identifier received with the incoming call signal to the fixed acceptance list and selectable rejection list;

wherein the mobile communication device accepts the incoming call if the source identifier is contained in the fixed acceptance list and rejecting the incoming call if the source identifier is contained in the selectable rejection list.

9. A mobile communication device for discriminating incoming calls as defined in claim 8, wherein the memory means further comprises a fixed rejection list, the fixed rejection list not being changeable by the user of the mobile communication device, the mobile communication device rejecting the incoming call if the source identifier is contained in the fixed rejection list.

10. A mobile communication device for discriminating incoming calls as defined in claim 8, wherein the memory means further comprises a selectable acceptance list, the selectable resection list being changeable by the user of the mobile communication device, the mobile communication device accepting the incoming call if the source identifier is contained in the selectable acceptance list.

11. A mobile communication device for discriminating incoming calls as defined in claim 8, wherein the memory means contains a means for indicating a state of a do not disturb feature, wherein after the source identifier has been compared to the fixed and selectable lists, the mobile communication device rejects the incoming call if the state of the do not disturb feature is active.

12. A mobile communication device for discriminating incoming calls as defined in claim 8, wherein the fixed acceptance list and the selectable rejection list are time dependent.

* * * * *